United States Patent
Sasaki et al.

(10) Patent No.: US 9,505,137 B2
(45) Date of Patent: Nov. 29, 2016

(54) SCOTT RUSSELL MECHANISM DEVICE

(75) Inventors: Hiromichi Sasaki, Kyoto (JP); Mikio Shimizu, Kyoto (JP); Yasunori Ichikawa, Kyoto (JP)

(73) Assignee: SQUSE Inc., Kyoto-shi (JP)

( * ) Notice: Subject to any disclaimer, the term of this patent is extended or adjusted under 35 U.S.C. 154(b) by 480 days.

(21) Appl. No.: 14/008,517

(22) PCT Filed: Mar. 30, 2011

(86) PCT No.: PCT/JP2011/058124
§ 371 (c)(1),
(2), (4) Date: Sep. 27, 2013

(87) PCT Pub. No.: WO2012/131955
PCT Pub. Date: Oct. 4, 2012

(65) Prior Publication Data
US 2014/0020507 A1    Jan. 23, 2014

(51) Int. Cl.
*B25J 18/00* (2006.01)
*B25J 9/10* (2006.01)
*F16H 21/44* (2006.01)
(Continued)

(52) U.S. Cl.
CPC *B25J 18/00* (2013.01); *B25J 9/04* (2013.01); *B25J 9/106* (2013.01); *B25J 17/00* (2013.01); *B25J 18/005* (2013.01); *F16H 21/44* (2013.01);
(Continued)

(58) Field of Classification Search
CPC .. B21D 43/00; B21D 43/003; B21D 43/006; B21D 43/04; B21D 43/105; B21D 43/11; B23Q 1/585; B23Q 1/603; B23Q 7/04; B23Q 7/043; B25J 15/0028; B25J 15/0226; B52J 18/025

USPC .......... 72/295, 297, 300, 102, 103; 294/115, 294/116
See application file for complete search history.

(56) References Cited

U.S. PATENT DOCUMENTS

| 4,345,864 A | 8/1982 | Smith, Jr. et al. |
| 5,634,376 A | 6/1997 | Kitamura |
| 6,715,981 B1 | 4/2004 | Harsch et al. |

FOREIGN PATENT DOCUMENTS

| CN | 201645491 U | 11/2010 |
| EP | 0182514 A1 | 5/1986 |

(Continued)

OTHER PUBLICATIONS

Japanese Patent Office, International Search Report of PCT/JP2011/058124, Jun. 15, 2011, WIPO, 4 pages.

(Continued)

*Primary Examiner* — Michael McCullough
*Assistant Examiner* — Brendan Tighe
(74) *Attorney, Agent, or Firm* — Alleman Hall McCoy Russell & Tuttle LLP

(57) ABSTRACT

A tip end part of a main arm member of a Scott Russell mechanism is enabled to be brought close to a base end part of a sub arm member. A Scott Russell mechanism device is formed into a boomerang-like shape such that a main arm member coupled to a sub arm member is curved to detour a coupling position. Thus, when the coupling angle is changed so that a base end part of the main arm member and a base end part of the sub arm member are most separated from each other, a tip end part of the main arm member can be moved close to right beside the base end part of the sub arm member. With the Scott Russell mechanism device, a moving range of the tip end side of the main arm member can be enlarged.

20 Claims, 14 Drawing Sheets

(51) Int. Cl.
*B25J 9/04* (2006.01)
*B25J 17/00* (2006.01)

(52) U.S. Cl.
CPC ......... *Y10S 901/25* (2013.01); *Y10T 74/18888* (2015.01); *Y10T 74/20329* (2015.01)

(56) References Cited

FOREIGN PATENT DOCUMENTS

| | | |
|---|---|---|
| FR | 2739801 A1 | 4/1997 |
| GB | 835227 A | 5/1960 |
| GB | 2124320 A | 2/1984 |
| JP | S58155185 A | 9/1983 |
| JP | 5966594 U | 5/1984 |
| JP | S59196181 A | 11/1984 |
| JP | S61109680 A | 5/1986 |
| JP | H0569378 A | 3/1993 |
| JP | H07186071 A | 7/1995 |
| JP | H07187344 A | 7/1995 |
| JP | H08132365 A | 5/1996 |
| JP | 2558080 B2 | 11/1996 |
| JP | H106258 A | 1/1998 |
| JP | 2000190259 A | 7/2000 |
| JP | 2004291171 A | 10/2004 |
| JP | 4156421 B2 | 9/2008 |
| JP | 2008272879 A | 11/2008 |
| JP | 2009034801 A | 2/2009 |
| JP | 2009208935 A | 9/2009 |
| JP | 4857177 B2 | 1/2012 |

OTHER PUBLICATIONS

Japanese Patent Office, International Search Report of PCT/JP2012/058634, Jun. 19, 2012, WIPO, 4 pages.
Artobolevsky, L, "Lever Mechanisms," Published in "Mechanisms in Modern Engineering Design," 1976, Mir Publishers Moscow, XP002735661, vol. 2, Part 1, p. 508, Figure 1542.
European Patent Office, Extended European Search Report Issued in Application No. 11862054.1, Mar. 10, 2015, Germany, 6 pages.

SCOTT RUSSELL MECHANISM DEVICE

TECHNICAL FIELD

The present invention relates to a device applied with a Scott Russell mechanism where a main arm member and a sub arm member are coupled to each other and a coupling angle therebetween is changeable, and particularly relates to a Scott Russell mechanism device that can allow a tip end part of a main arm member to approach a sub arm member without interfering even in a case where the coupling angle of the base end parts of the main arm member and the sub arm member is changed so that the base end parts are spaced from each other, and can attach various kinds of units to the tip end side of the main arm member and change postures of the units in a wide range.

BACKGROUND ART

Conventionally, various kinds of devices using a Scott Russell mechanism exist. A Scott Russell mechanism is a mechanism where a linear main arm member is pivotably coupled to a sub arm member, a distance from a base end part of the main arm member to a coupling position thereof, a distance from the coupling position of the main arm member to a tip end part thereof, and a distance from a coupling position of the sub arm member to a base end part thereof are all equal to each other, and in a case where a coupling angle between both of the arm members is changed, the tip end part of the main arm member linearly moves along a straight line connecting the tip end part of the main arm member and the based end part of the sub arm member.

Patent Document 1 discloses a Scott Russell mechanism applied to an industrial robot. Further, Patent Document 2 discloses a Scott Russell mechanism applied to a positioning transport device. Moreover, Patent Document 3 discloses a Scott Russell mechanism applied to a drive structure of a feed arm. Furthermore, Patent Document 4 discloses a Scott Russell mechanism applied to an industrial robot. Further, Patent Document 5 discloses a Scott Russell mechanism in a modified example where the coupling between the main arm member and the sub arm member is in a crank shape, the Scott Russell mechanism applied to a transport device.

REFERENCE DOCUMENTS OF CONVENTIONAL ART

Patent Documents

Patent Document 1: JP1983-155185A
Patent Document 2: JP2000-190259A
Patent Document 3: JP1995-187344A
Patent Document 4: JP1984-196181A
Patent Document 5: JP2009-208935A

SUMMARY OF THE INVENTION

Problems to be Solved by the Invention

With the industrial robot according to Patent Document 1, a main arm member (the first arm 31 in Patent Document 1) and a sub arm member (the second arm 32 in Patent Document 1) have fixed thicknesses to secure a desired rigidity (have fixed width and thickness dimensions in cross-sections orthogonal to longitudinal directions of both of the arm members), and thus, as base end parts of both of the arm members (end parts on the screw shaft 21 side in Patent Document 1) are spaced from each other, the arm members interfere with each other at a coupling position of both of the arm members, and a problem arises that the tip end part of the main arm member (end part on the side where the holder H is provided in Patent Document 1) cannot be moved proximally to the sub arm member (a problem arises that the holder H is hard to be moved close at hand to the screw shaft 21 side). Moreover, with the industrial robot according to Patent Document 1, both of the arm members are rotated (turned) about the screw shaft 21 as a rotation center (turning center), then all of the industrial robot including the screw shaft 21 is turned, and thus a problem arises that a drive torque for the turning increases.

Further, as for the positioning transport device according to Patent Document 2, the drive structure of the feed arm according to Patent Document 3, the industrial robot according to the Patent Document 4, and the transport device according to Patent Document 5, the main arm member and the sub arm member are overlapped on and coupled to each other in a thickness direction, and thus, the tip end part of the main arm member is easily drawn proximally to the sub arm member. However, since both of the arm members are arranged offset from each other in the overlapped direction, a problem arises that the thickness dimension (dimension in the direction overlapping both of the arm members) of the device increases, and since the centers of both of the arm members in the thickness direction do not match with each other, a problem also arises that the balance in weight degrades in both of the entire arm members.

Moreover, in each of the above-described patent documents, various kinds of units, such as the holder, the arm, and the hand, are attached to the tip end of the main arm member. Since the postures of these units on the tip end side depend on the direction (posture) of the tip end of the main arm member, a problem arises that a range in which the postures of the units attached to the tip end of the main arm member can be changed is limited.

The present invention is made in view of the above situations, and aims to provide a Scott Russell mechanism device that is capable of drawing close to a tip end part of a main arm member proximally to a sub arm member by forming the main arm member into a boomerang-like shape without arranging both of the arm members offset from each other.

Moreover, the present invention aims to provide a Scott Russell mechanism device that allows a main arm member and a sub arm member to pivot at a base end part of both of the arm members to reduce a drive torque for turning both of the arm members, and to increase in degree of freedom in postures of various kinds of units attached to a tip end of the main arm member compared to the conventional degree.

Means for Solving the Problem

In order to solve the above problem, a Scott Russell mechanism device according to the present invention includes a main arm member, a sub arm member pivotably coupled to the main arm member, and an angle changer for changing a coupling angle between the main arm member and the sub arm member. A base end part of the main arm member and a base end part of the sub arm member that is on the opposite side from the coupling side of the sub arm member are positioned on the same virtual straight line, and a first distance from the base end part of the main arm member to a coupling position of the main arm member to the sub arm member, a second distance from the coupling position of the main arm member to a tip end part thereof, and a third distance from the base end part of the sub arm member to the coupling position are equal to each other. The main arm member is formed into a boomerang-like shape such that the coupling position is curved to detour to an opposite side from the side where the sub arm member is positioned.

In the present invention, the main arm member is formed into the boomerang-like shape to detour to the opposite side of the side where the sub arm member is positioned. Therefore, even if the main arm member and the sub arm member are not arranged to offset from each other, when the coupling angle is changed so that the base end parts of both of the arm members are separated from each other, interference between the arm members at the coupling position of both of the arm members is subsided, and the tip end part of the main arm member is easily drawn close to the sub arm member.

Moreover, in the Scott Russell mechanism device according to the present invention, the sub arm member may be linearly formed. The main arm member may be formed linearly in a first section extending from the base end part to the part corresponding to the coupling position and a second section extending from the part corresponding to the coupling position to the tip end part, and the part corresponding to the coupling position is curved. The degree of the curve of the main arm member may be defined such that the second section of the main arm member becomes at a substantially parallel angle to the sub arm member when the angle changer changes the coupling angle so that the base end parts of the main arm member and the sub arm member are most separated from each other.

In the present invention, when the coupling angle is changed so that the base end parts of the main arm member and the sub arm member are most separated from each other, the degree of the curve of the main arm member is defined such that the second section of the main arm member is in a substantially parallel orientation to the linear sub arm member. Thus, the tip end part of the main arm member can be drawn to the sub arm member to the extent where the tip end part of the main arm member is adjacent to be right beside the base end part of the sub arm member. Note that, the substantially parallel angle means that it does not require an accurate parallelism with respect to the sub arm member but includes a slight angle variation, and in the present invention, the substantially parallel angle can be said to be parallel as long as it is within a range of ±10° with respect to the axis of the sub arm member in the longitude direction (also in other parts of description a variation range of ±10° with respect to the accurate parallelism is included in the meaning of the phrase "substantially parallel").

Further, in the Scott Russell mechanism device according to the present invention, the main arm member and the sub arm member may be pivotable about the virtual straight line as a pivoting axis thereof. The angle changer may have a first ball screw arranged in parallel to the virtual straight line, and a first linearly-moving unit for being linearly moved by a rotation of the first ball screw. Either one of the base end part of the main arm member or the base end part of the sub arm member may be pivotably coupled to the first linearly-moving unit about the virtual straight line as the pivoting axis thereof. The device may include a pivoting drive source for driving the pivots of the main arm member and the sub arm member centering on the pivoting axis.

In the present invention, either one of the base end parts of both of the arm members is linearly moved by the rotation of the first ball screw, and the pivots (turnings) of both of the arm members are driven about the virtual straight line connecting the base end parts of both arm members therebetween as the pivoting axis thereof, resulting in only both of the arm members turning. Therefore, the first ball screw will be excluded from the turning targets, compared to the turnings of both of the arm members of the industrial robot relating to the reference document 1 described above, a drive torque caused by the turn is reduced, and both of the arm members can be turned smoothly.

Furthermore, in the Scott Russell mechanism device according to the present invention, the angle changer may also have a second ball screw arranged in parallel to the first ball screw, and a second linearly-moving unit for being linearly moved by a rotation of the second ball screw. Either one of the base end part of the sub arm member or the base end part of the main arm member may be pivotably coupled to the second linearly-moving unit about the virtual straight line as the pivoting axis thereof.

In the present invention, the base end part of either one of the sub arm member or the main arm member is linearly movable by the second ball screw. Therefore, a plurality of variations can be provided to the method of moving the base end part of both of the arm members, resulting in being able to flexibly perform the moving of the tip end part of the main arm member. Specifically, the tip end part of the main arm member can be moved by only moving the base end part of the main arm member, by only moving the base end part of the sub arm member, or by moving both of the base end parts of both of the arm members, respectively. Further, when both of the base end parts of both of the arm members are moved in the same direction by the same amount, both of the arm members can be moved entirely while keeping their postures.

Moreover, in the Scott Russell mechanism device according to the present invention, a joint unit may be pivotably coupled to the tip end part of the main arm member. A pivoting axis of the pivot of the joint unit may be in parallel to an axis of the pivots of the main arm member and the sub arm member at the coupling position. The device may include a pivoting mechanism unit for automatically pivoting the joint unit cooperating with the angle change by the angle changer, a pivot driving unit for pivoting the joint unit via the pivoting mechanism unit independently from the angle change by the angle changer.

In the present invention, the joint unit pivotably coupled to the tip end part of the main arm member can be pivoted in the total of two kinds of manners including the pivot cooperating with the angle change between both of the arm members at the coupling position and the pivot independent to the angle change. Therefore, as for the application of the Scott Russell mechanism device according to the present invention, the posture of the joint unit can be changed in the total of two kinds of manners.

Moreover, in the Scott Russell mechanism device according to the present invention, a joint unit may be pivotably coupled to the tip end part of the main arm member. A pivoting axis of the pivot of the joint unit may be in parallel to an axis of the pivots of the main arm member and the sub arm member at the coupling position. The device may include a pivot driving unit provided at any portion from the coupling position toward the tip end side of the main arm member and for pivoting the joint unit.

In the present invention, the pivoting of the joint unit pivotably coupled to the tip end part of the main arm member is driven by the pivot driving unit. Therefore, the posture of the joint unit can be controlled freely. Moreover, the pivot driving unit is provided at any portion from the coupling position to the tip end side of the main arm member. The distance from the pivot driving unit to the joint unit becomes closer, and the transmission mechanism regarding the drive can be coordinated compactly.

Furthermore, in the Scott Russell mechanism device according to the present invention, a rotation unit having a rotor may be coupled to the joint unit.

In the present invention, the rotation unit is coupled to the joint unit. Therefore, since the rotation unit has the rotor that is rotatable independently to the displacement of the tip end part of the main arm member, the degree of freedom of the posture of the rotor of the rotation unit provided to the tip end side of the main arm member improves. The application of the Scott Russell mechanism device according to the present invention expands by attaching various kinds of units corresponding to various applications to its rotor.

Moreover, in the Scott Russell mechanism device according to the present invention, a pivoting member may be pivotably coupled to the joint unit. An axis of the pivot of the pivoting member may be in parallel to the pivoting axis of the joint unit. A rotation unit having a rotor may be coupled to the pivoting member.

In the present invention, the pivoting member is pivotably coupled to the joint unit and the rotation unit having the rotor is coupled to the pivoting member. Therefore, the rotation unit attached to the joint unit via the pivoting member can displace its rotor independently of the displacement of the tip end part of the main arm member. Thus, the degree of posturing freedom of the rotor of the rotation unit positioned to the farthest tip end increases, and the application of the Scott Russell mechanism device according to the present invention further expands.

Further, in the Scott Russell mechanism device according to the present invention, a gripping unit may be attached to the rotor of the rotation unit.

In the present invention, the gripping unit is attached to the rotor of the rotation unit. Therefore, by the rotor of the rotation unit where the amount of the postural displacement is increased compared to the conventional device, the Scott Russell mechanism device according to the present invention can be applied to the application of performing the gripping while flexibly responding to the orientation of a workpiece as a gripping target.

Furthermore, in the Scott Russell mechanism device according to the present invention, a rotation unit having a rotor may be coupled to the joint unit. A pivoting unit having a pivoting part that is pivotable centering on an axis in parallel to the pivoting axis of the joint unit may be coupled to the rotor of the rotation unit.

In the present invention, the joint unit, the rotation unit, and the pivoting unit are coupled to each other in this order. Therefore, compared to the case of coupling the units in an order different from above, the pivoting unit positioned at the farthest tip end can perform the postural displacement in a different range.

Further, in the Scott Russell mechanism device according to the present invention, a gripping unit may be attached to a tip end side of the pivoting unit.

In the present invention, the gripping unit is attached to the tip end side of the pivoting unit. Therefore, the gripping unit can be pivoted proximally to the workpiece which is the gripping target, and the Scott Russell mechanism device including a griping function suitable for such a gripping application can be provided.

Effects of the Invention

In the present invention, the shape of the main arm member is a boomerang-like shape. Therefore, even if the main arm member and the sub arm member are not arranged to offset from each other, interference between the arm members at the coupling position of both of the arm members can be subsided, and compared to the conventional device without an offset arrangement, the tip end part of the main arm member can be drawn close to the sub arm member.

Moreover, in the present invention, when the coupling angle is changed so that the base end parts of the main arm member and the sub arm member are most separated from each other, the degree of the curve of the main arm member is defined such that the second section of the main arm member is in a substantially parallel orientation to the linear sub arm member. Thus, the tip end part of the main arm member can be drawn more to the base end part of the sub arm member.

In the present invention, either one of the base end parts of both of the arm members is linearly moved by the rotation of the first ball screw, and the pivots (turnings) of both of the arm members are driven about the virtual straight line connecting the base end parts of both arm members therebetween as the pivoting axis thereof so as to turn only both of the arm members. Therefore, compared to the conventional device, a drive torque caused by the turning can be reduced, and both of the arm members can be turned smoothly.

Moreover, in the present invention, the base end part of either one of the sub arm member or the main arm member is linearly movable by the second ball screw. Therefore, a plurality of variations can be provided to the method of moving the base end part of both of the arm members, and the tip end part of the main arm member can move flexibly.

In the present invention, the joint unit pivotably coupled to the tip end part of the main arm member can be pivoted in a total of two kinds of manners including the pivot cooperating with the angle change between both of the arm members at the coupling position and the pivot independent of the angle change. Therefore, the application of the Scott Russell mechanism device according to the present invention expands.

Moreover, in the present invention, the pivot of the joint unit pivotably coupled to the tip end part of the main arm member is driven by the pivot driving unit. Therefore, the posture of the joint unit can be controlled freely, and additionally, since the pivot driving unit is provided from the coupling position toward the tip end side of the main arm member, the distance to the joint unit becomes close, and the drive transmission mechanism can be scaled down.

In the present invention, the rotation unit having the rotor is coupled to the joint unit. Therefore, since the rotor of the rotation unit can rotate independently of the displacement of the tip end part of the main arm member, the displacement amount of the rotor of the rotation unit coupled to the tip end side of the main arm member can be increased, and the application of the Scott Russell mechanism device according to the present invention further expands.

Moreover, in the present invention, the pivoting member is pivotably coupled to the joint unit and the rotation unit having the rotor is coupled to the pivoting member. Therefore, the rotation unit attached to the joint unit via the pivoting member can displace its rotor independently of the amount of the displacement of the tip end part of the main arm member, and the postural displacement of the rotor positioned at the farthest tip end increases much more.

Further, in the present invention, the gripping unit is attached to the rotor of the rotation unit. Therefore, the gripping (chucking) flexibly responding to the orientation of a workpiece as a gripping target can be performed by the rotor of the rotation unit of which the amount of the postural displacement is increased, and the Scott Russell mechanism device according to the present invention can suitably be used for the gripping application.

In the present invention, the joint unit, the rotation unit, and the pivoting unit are coupled to each other in this order. Therefore, the rotation unit can perform the postural displacement in a different range from the case of coupling in an order different from the above, and the application of the Scott Russell mechanism device according to the present invention further expands.

Moreover, in the present invention, the gripping unit is attached to the tip end side of the pivoting unit. Therefore, the gripping unit can be pivoted proximally to the workpiece which is the gripping target, and the Scott Russell mechanism device including a gripping function suitable for such a gripping application can be provided.

MODES FOR CARRYING OUT THE INVENTION

Figure 1:
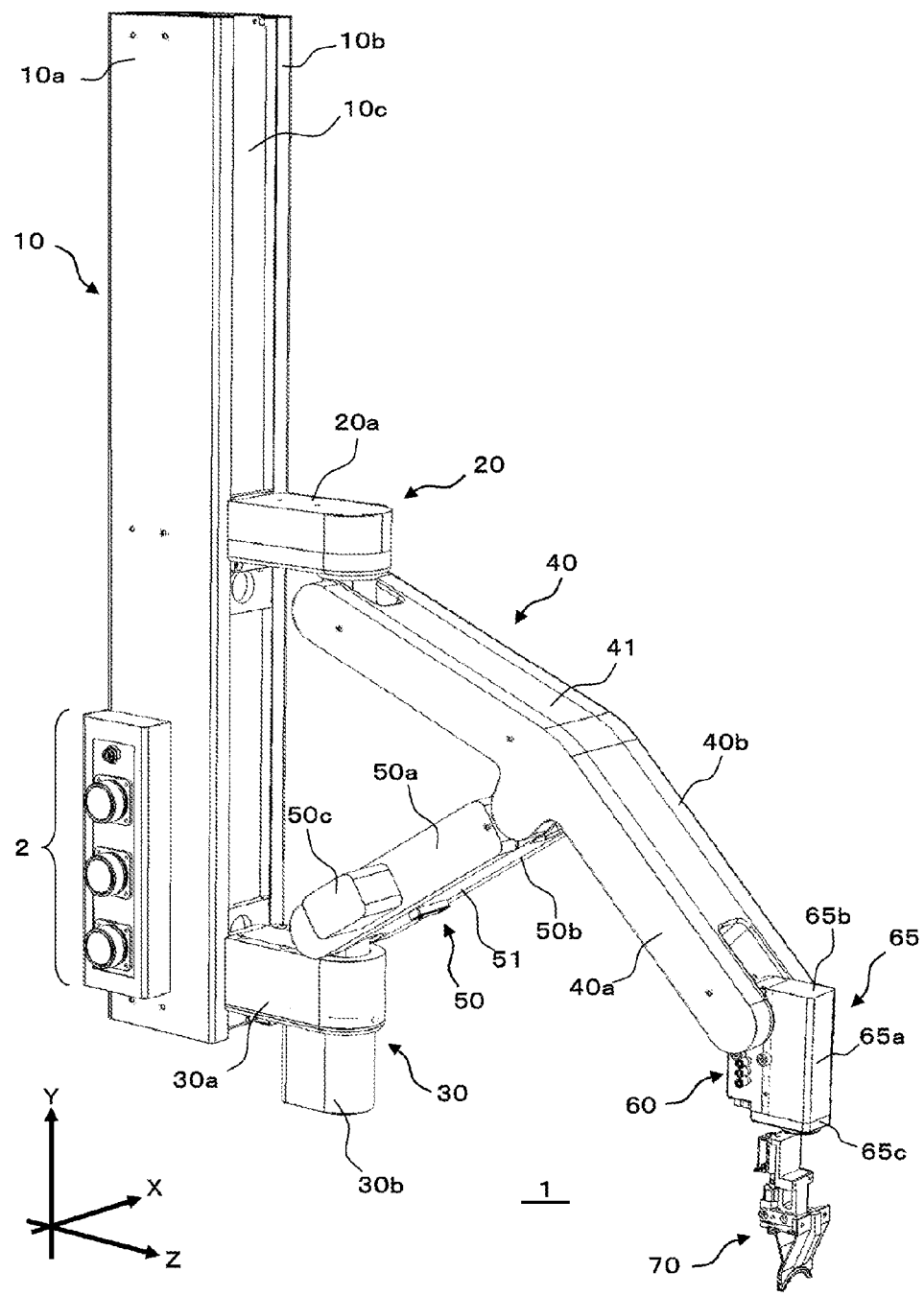
FIG. 1 is a perspective view illustrating a Scott Russell mechanism device according to a first embodiment of the present invention.

FIG. 1 illustrates a Scott Russell mechanism device 1 according to a first embodiment of the present invention.

The Scott Russell mechanism device 1 of the first embodiment corresponds to a gripping application, and a gripping unit 70 is attached to a tip end of a main arm 40 that is pivotably coupled to a sub arm 50, via a joint unit 60 and a rotation unit 65. A pillar unit 10 extending in a vertical direction is provided to root end sides of the main arm 40 and the sub arm 50, and the pillar unit 10 includes a linearly-movable second slider 20 (corresponding to the second linearly-moving unit of the present invention) and a linearly-movable first slider 30 (corresponding to the first linearly-moving unit of the present invention). To these first and second sliders 20 and 30, the main arm 40 and the sub arm 30 are coupled on their root end sides (base end parts), respectively.

FIG. 1 illustrates an exterior appearance where various kinds of covers form an outer circumference of the Scott Russell mechanism device 1. As the outer circumferential covers, there are side face covers 10a and 10b and a front face side cover 10c of the pillar unit 10, a surrounding cover 20a of the second slider 20, a surrounding cover 30a of the first slider 30, a motor cover 30b of the first slider 30, side face covers 40a and 40b covering both side faces of a main arm member 41 of the main arm 40, side face covers 50a and 50b covering both side faces of a sub arm member 51 of the sub arm 50, a motor cover 50c of the sub arm 50, and a motor cover 65a of the rotation unit 65, etc. Moreover, the Scott Russell mechanism device 1 is provided with an external line connection part 2 having a total of three connectors, below the side face cover 10a which is one of the side face covers of the pillar unit 10. This external line connection part 2 includes a connector for power lines for driving motors (motors M1 to M5), a connector for detection lines relating to detections of motor rotation quantities (detection by rotary encoders built in the motors), and a connector for a control line of a drive valve of a pneumatic pressure cylinder included in the gripping unit 70.

Figure 5:
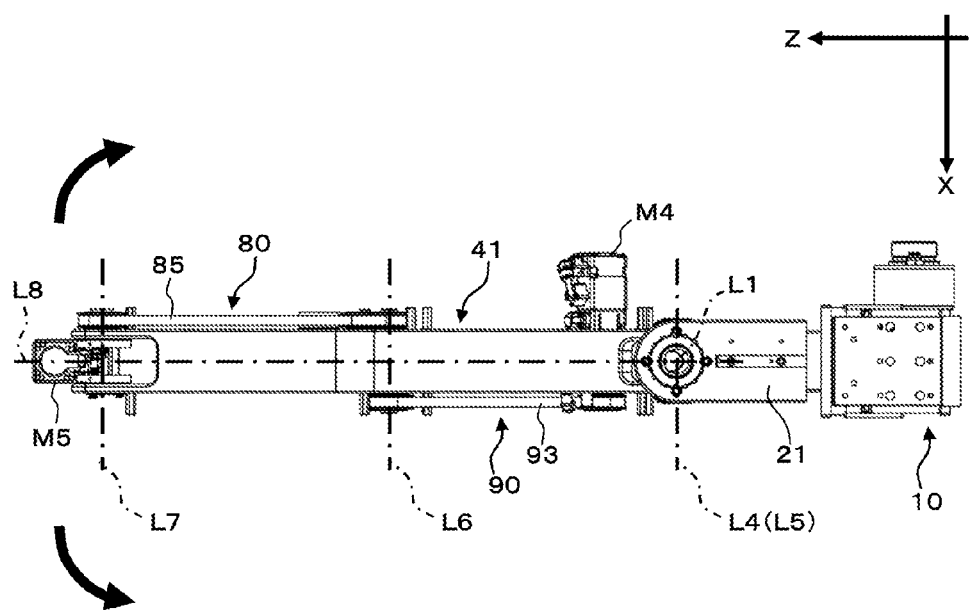
FIG. 5 is a plan view of the Scott Russell mechanism device.
Figure 6:
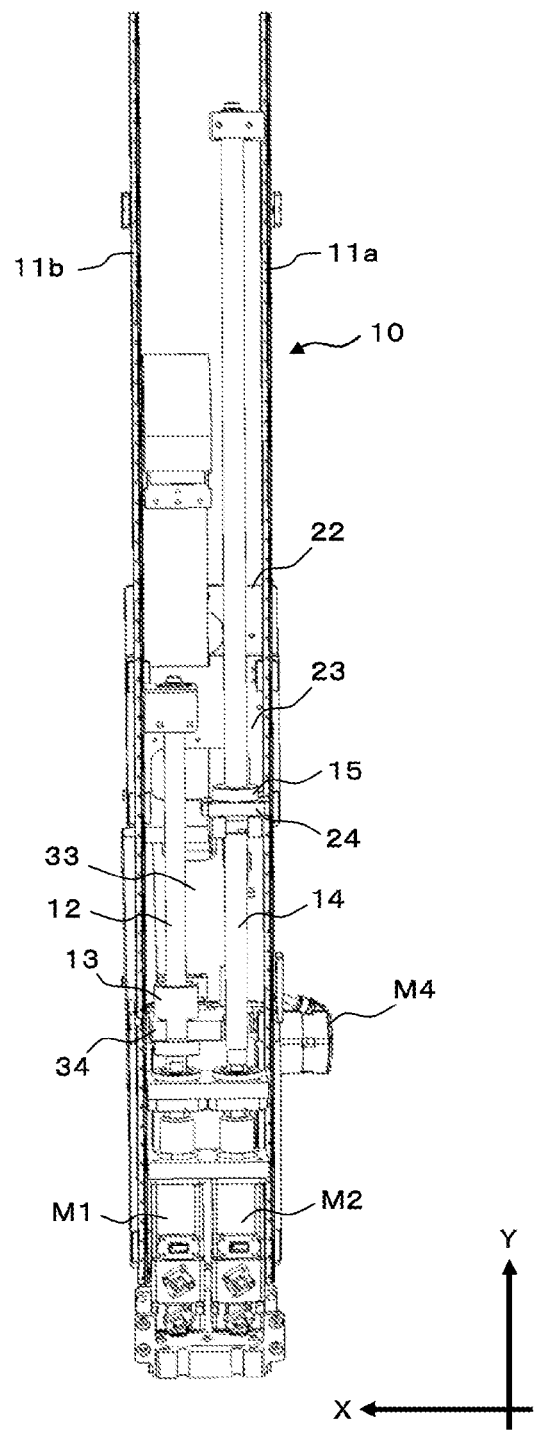
FIG. 6 is a rear view of a pillar unit of the Scott Russell mechanism device.
Figure 7:
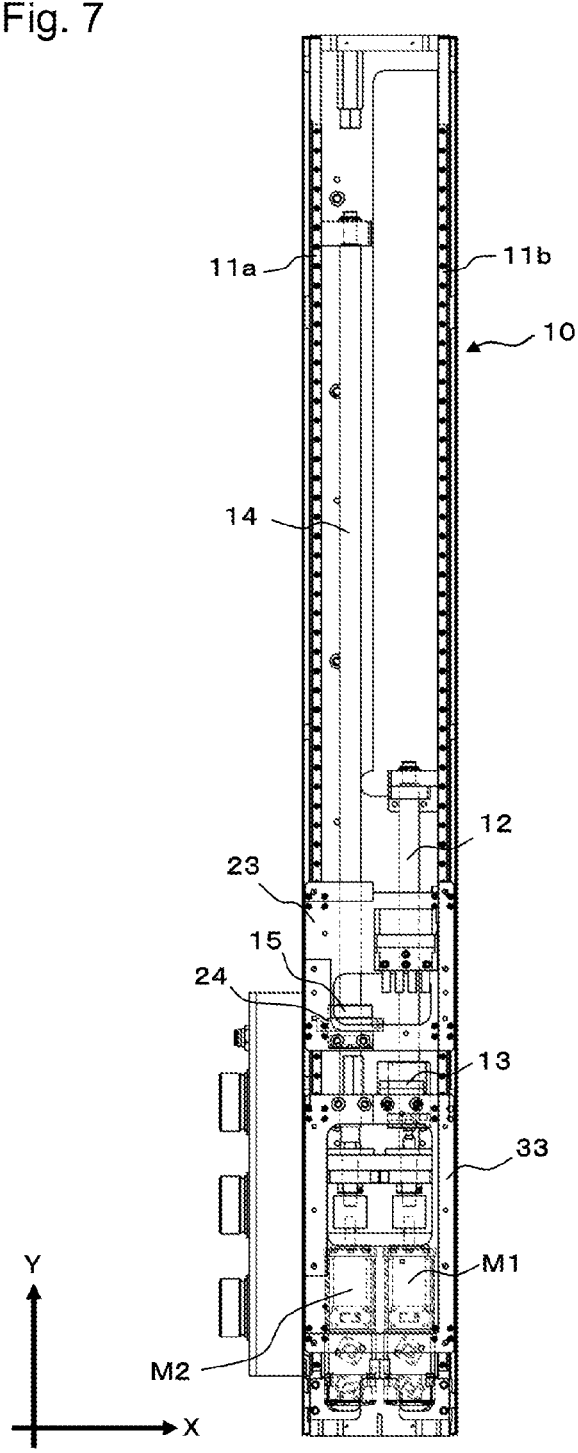
FIG. 7 is a front view of the pillar unit where a main part is seen from a line 7-7 of FIG. 4.

Note that, a direction of the X-axis illustrated in FIG. 1 corresponds to a direction in parallel to a thickness direction of the pillar unit 10 (see FIGS. 5 to 7). Moreover, a direction of the Y-axis corresponds to a direction in parallel to a longitudinal direction of the pillar unit 10 and also is a direction orthogonal to the X-axis. Furthermore, a direction of the Z-axis corresponds to a direction in parallel to a width direction of the pillar unit 10 and also is a direction orthogonal to both of the X-axis and the Y-axis. The directions of the X-axis, the Y-axis, and the Z-axis are common in other drawings as well (FIG. 2 and thereafter).

Figure 2:
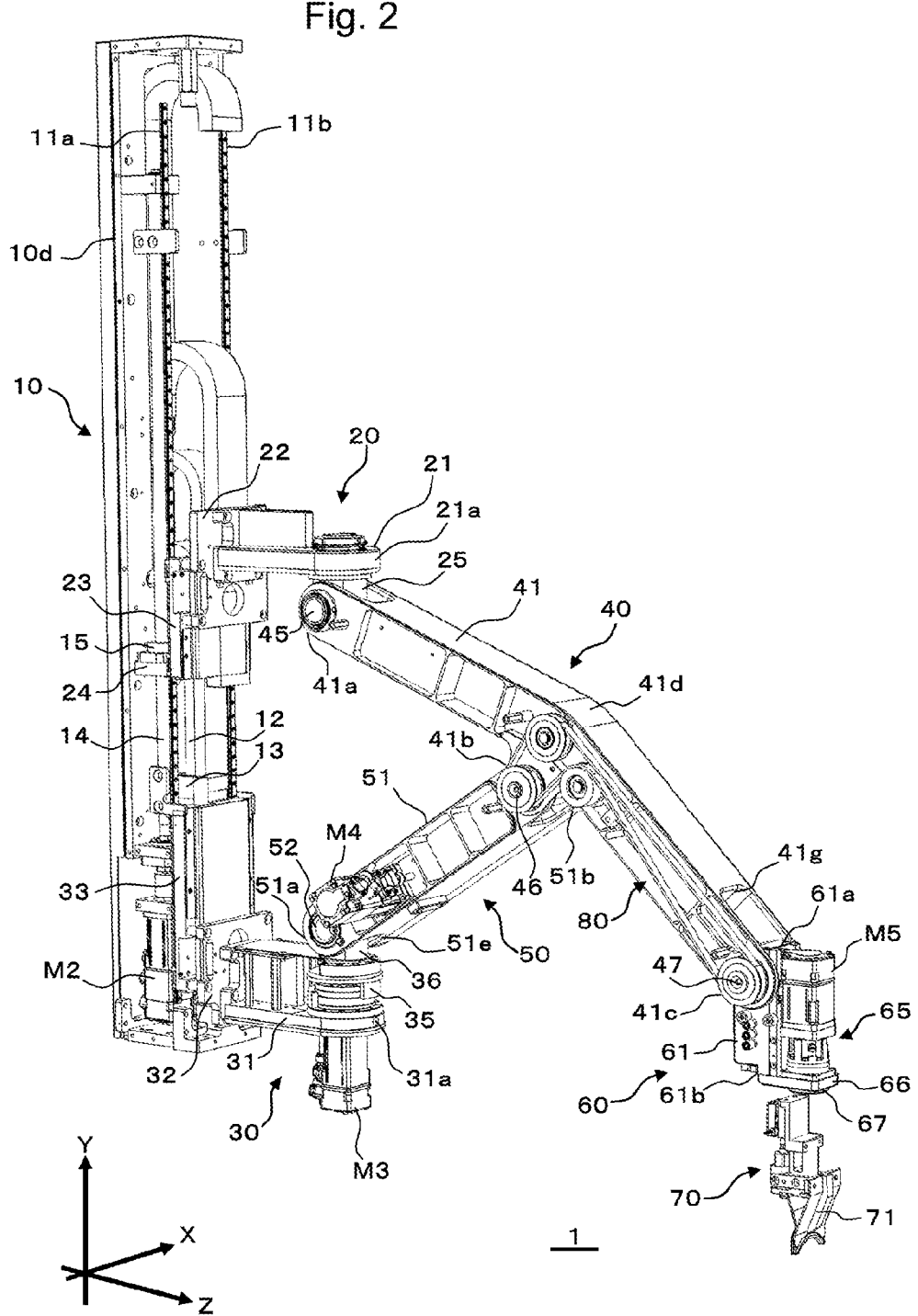
FIG. 2 is a perspective view illustrating the Scott Russell mechanism device of the first embodiment in a state where covers covering an outer circumference of the Scott Russell mechanism device are removed.
Figure 3:
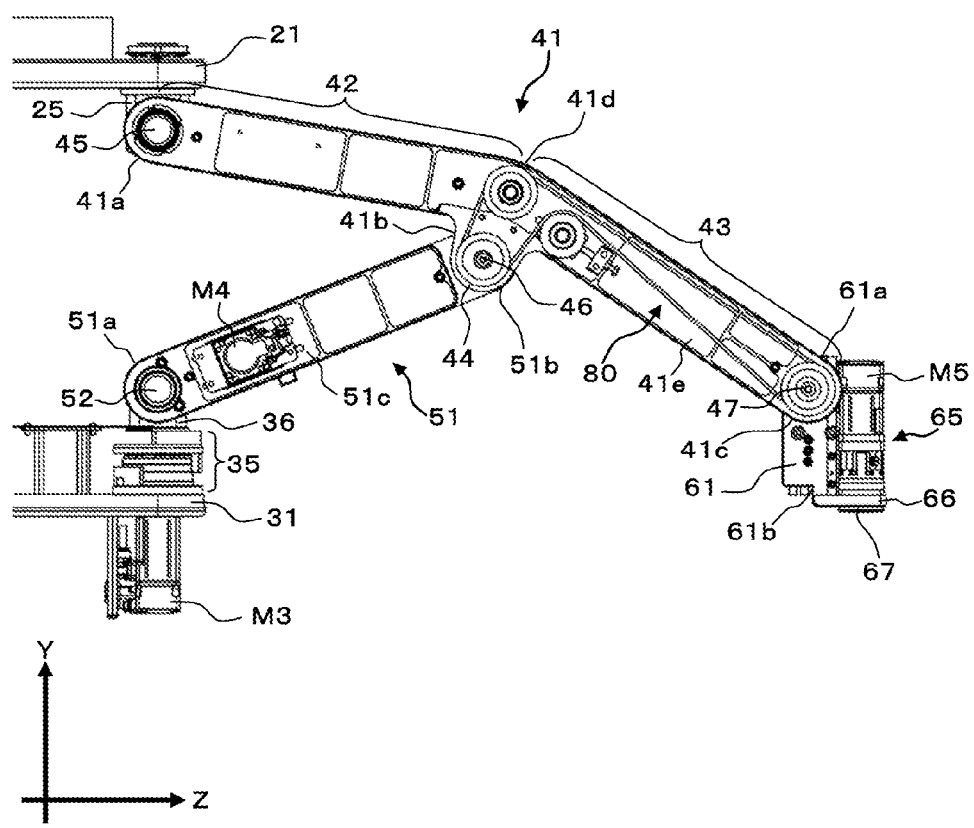
FIG. 3 is a side view of a main arm member, a sub arm member and the like of the Scott Russell mechanism device seen from one direction.

FIG. 2 illustrates the Scott Russell mechanism device 1 in a state where the above-described various kinds of covers and the like illustrated in FIG. 1 are removed and the internal configuration is illustrated (FIG. 3 and thereafter also illustrate the state where the various kinds of covers and the like are removed, note that, in FIGS. 3 to 9, the illustration of the gripping unit 70 and the like is omitted to simplify the drawings). Hereinafter, the structure and the like of the pillar unit 10, the first slider 30, the second slider 20, the main arm 40, the sub arm 50, the joint unit 60, the rotation unit 65, and the gripping unit 70 of the Scott Russell mechanism device 1 are described.

The pillar unit 10 illustrated in, for example, FIGS. 2, 6 and 7, is provided with linear slide guide rails 11a and 11b on both sides of a front face side thereof where the main arm 40 and the sub arm 50 are positioned, in a substantially whole range of height of the pillar unit 10. Moreover, the pillar unit 10 is arranged with a first ball screw 12 and a second ball screw 14 in parallel to the Y-axis, inward of the slide guide rails 11a and 11b. The first ball screw 12 is for linear movement of the first slider 30 and the second ball screw 14 is for linear movement of the second slider 20. In this embodiment, a moving amount of the second slider 20 is specified to be larger than that of the first slider 30, and therefore, a screw shaft length of the second ball screw 14 is set longer than that of the first ball screw 12 (by approximately three times in this embodiment). In order to prevent an increase of the height dimension of the pillar unit 10, both of the ball screws 12 and 14 are arranged to overlap in the Y-axis and a plurality of plates are displaced from each other and intervene (offset) in the connection between the sliders 30 and 20 as described later, so that the first slider 30 and the second slider 20 can be positioned in line in the Y-axis direction.

Further, as illustrated in FIGS. 6 and 7, the first motor M1 is coupled to a lower end of the first ball screw 12 and the second motor M2 is coupled to a lower end of the second ball screw 14. By driving these motors M1 and M2, the first ball screw 12 and the second ball screw 14 can rotate to either one of a clockwise rotational direction and counterclockwise rotational direction.

Moreover, the first ball screw 12 is fitted with a ball screw nut 13 partially having a cylindrical shape (see FIG. 6), and the ball screw nut 13 moves along the Y-axis direction by the rotation of the first ball screw 12.

The ball screw nut 13 is engaged with a coupling bracket 34 of the first slider 30, and the coupling bracket 34 is attached to a slide plate 33 that is guided by the above-described slide guide rail 11a and 11b to move linearly (see FIGS. 2, 6 and 7). Further, as for the first slider 30, the bracket plate 32 is attached substantially in parallel to the slide plate 33 with intervention of spacers to provide a predetermined gap so that the bracket plate 32 covers a lower area of the slide plate 33. Furthermore, the first slider 30 is provided with an attaching bracket 31 for the sub arm 50 to stand from the bracket plate 32 in the Z-axis direction. Note that, the above-described front face side cover 10c of the pillar unit 10 is positioned in the gap between the slider plate 33 and the bracket plate 32 such that even when the slide plate 33 moves along the slide guide rails 11a and 11b, the front face side cover 10c can cover inside the pillar unit 10.

The first slider 30 is attached with a rotation supporting unit 35 including a bearing and the like on a tip end 31a side an upper face of the attaching bracket 31 (in the direction indicated by the arrow of the Y-axis), and a coupling member 36 on an upper part of the rotation supporting unit 35. Moreover, the first slider 30 is attached with the third motor M3 (corresponding to the pivoting drive source of the present invention) on a lower face of the attaching bracket 31 (in the direction opposite from the arrow direction of the Y-axis), and by the drive of this third motor M3, the coupling member 36 can rotate to either one of a clockwise rotational direction or counterclockwise rotational direction via the rotation supporting unit 35. Note that, since the first slider 30 is attached such that the rotation supporting unit 35 and the coupling member 36 stand on the upper face of the attaching bracket 31, the interference between the sub arm 50 (sub arm member 51) coupled to this coupling member 36 and the attaching bracket 31 can be avoided, and thus, for example, the posture of the sub arm 50 (sub arm member 51) can be changed to the posture illustrated in FIG. 9, and as a result, contributing in enabling to draw a tip end of the main arm 40 (main arm member 41) proximally to a root of the sub arm 50 (sub arm member 51).

Moreover, the second slider 20 basically has a configuration similar to the first slider 30 described above, in which a ball screw nut 15 fitted to second ball screw 14 (see FIG. 6, the ball screw nut 15 also moves along the Y-axis direction by the rotation of the second ball screw 14) is attached with a coupling bracket 24, and this coupling bracket 24 is attached to a slide plate 23 that is guided by the above-described slide guide rail 11a and 11b to move linearly (see FIGS. 2, 6 and 7). Further, as for the second slider 20, the bracket plate 22 is attached substantially in parallel to the slide plate 23 with a predetermined gap therebetween by a spacer, so as to cover an upper area of the slide plate 23. An attaching bracket 21 for the main arm 40 is provided to this bracket plate 22.

Further, in the second slider 20, a coupling member 25 is rotatably attached with a lower face of a tip end 21a (side) of the attaching bracket 21 (in the direction opposite from the arrow direction of the Y-axis) via, for example, a bearing. A center axis of the rotation of the coupling member 25 and a center axis of the coupling member 36 of the first slider 30 described above are positioned on the same straight line that is in parallel to the Y-axis, specifically, rotation axes (pivot axes) of the coupling members 25 and 36 match with a first axis L1 (corresponding to the virtual straight line) illustrated in FIG. 4.

Figure 4:
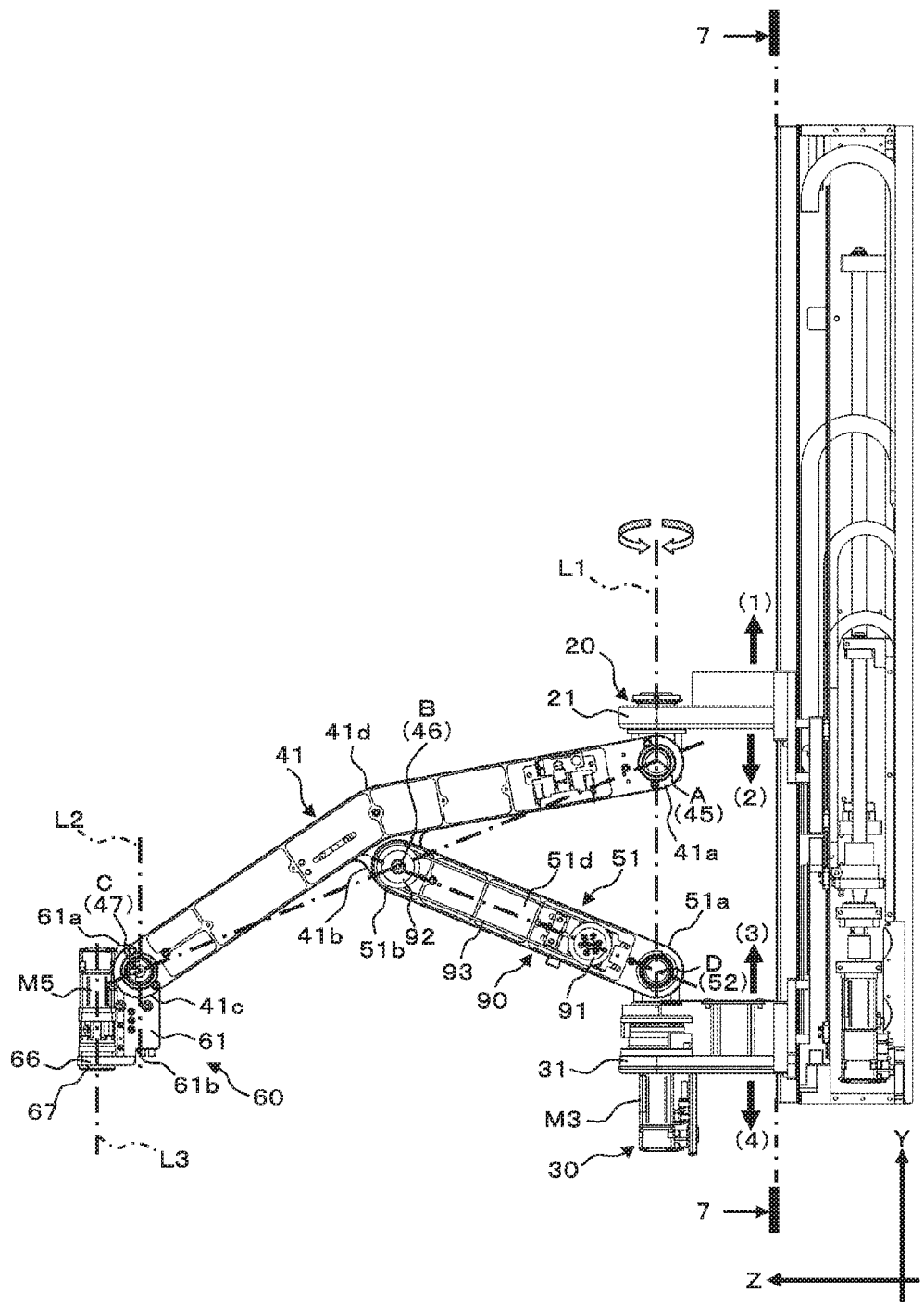
FIG. 4 is a side view of the Scott Russell mechanism device seen from another direction.

The base end part 41a of the main arm member 41 forming the main arm 40 is pivotably coupled with the coupling member 25 of the second slider 20 described above. Note that, since the coupling member 25 is attached to hang down from the lower face of the attaching bracket 21, similar to the case of the above described sub arm 50 (sub arm member 51), the interference between the main arm 40 (main arm member 41) and the attaching bracket 21 can be avoided, and thus, the posture of the main arm 40 (main arm member 41) can be changed to the posture illustrated in FIG. 9. The main member 41 has a desired rigidity and is, as illustrated in FIGS. 3, 4, and the like, overall formed into a boomerang-like shape (the shape of the Japanese kana character "HE") by being bent at an intermediate part 41d in the longitudinal direction (and the coupling position 41b coupled to the sub arm member 50 located on the other side of the intermediate part 41d). Specifically, the main arm member 41 is formed as a linear first section 42 in an area from the base end part 41a, which is the coupling side to the coupling member 25 of the second slider 20, to the intermediate part 41d (coupling position 41b), as well as it is formed as a linear second section 43 in an area from the intermediate 41d (coupling position 41b) to the tip end part 41c (see FIG. 3), and has a shape bent at the coupling position 41b so that an angle on the coupling position 41b side sandwiched by the first section 42 and second section 43 is made narrower than 180°.

About the above-described angle on the coupling position 41b side, the angle is set so that the second section 43 of the main arm member 41 is in a substantially parallel angle to the sub arm member 51 in a state where the base ends 41a and 51a of the respective main arm member 41 and sub arm member 51 are most separated from each other as described later (see FIG. 9). Note that, in this embodiment, although the parallelism between the second section 43 of the main arm member 41 and the sub arm member 51 is unexacting and there is approximately 2° of unevenness, in the present invention, it is defined that the unevenness within a range of approximately ±10° means a substantially parallel angle.

Moreover, the main arm member 41 is protrudingly provided with a plate-like convex part 44 used for coupling to the sub arm member 51, at the coupling position 41b. Therefore, the main arm member 41 is bent at the intermediate part 41d where the first section 42 joins with the second section 43 in such a way that a bent portion of the main arm member 41 detours the convex part 44 of the coupling position 41b toward the opposite side of the side where the sub arm member 51 is located.

Such a main arm member 41 is formed with a concave part 41f in the base end part 41a (see FIG. 2), the coupling member 25 protrudingly provided downward from the second slider 20 is arranged in this concave part 41f, and a coupling shaft 45 (see FIGS. 2 and 3) rotatably couples the base end part 41a of the main arm member 41 to the coupling member 25. Note that, the coupling shaft 45 is a shaft in parallel to the main arm member 41 in the thickness direction (the shaft in parallel to the X-axis in a state where the arms are not turned, illustrated in FIG. 2) and corresponds to a fourth axis L4 illustrated in FIG. 5. Moreover, the main arm member 41 is also formed with a concave part 41g for coupling to the joint unit 60 described later, in the tip end part 41c similarly to the base end part 41a (see FIG. 2). Note that, the main arm member 41 is secured in desired dimensions in a cross-section orthogonal to the longitudinal direction (each dimensions of height and thickness) so that, for example, a motor, electric lines for various kinds of controls, and an air supply pipe for a pneumatic pressure cylinder, can be laid and arranged inside the member.

Figure 8:
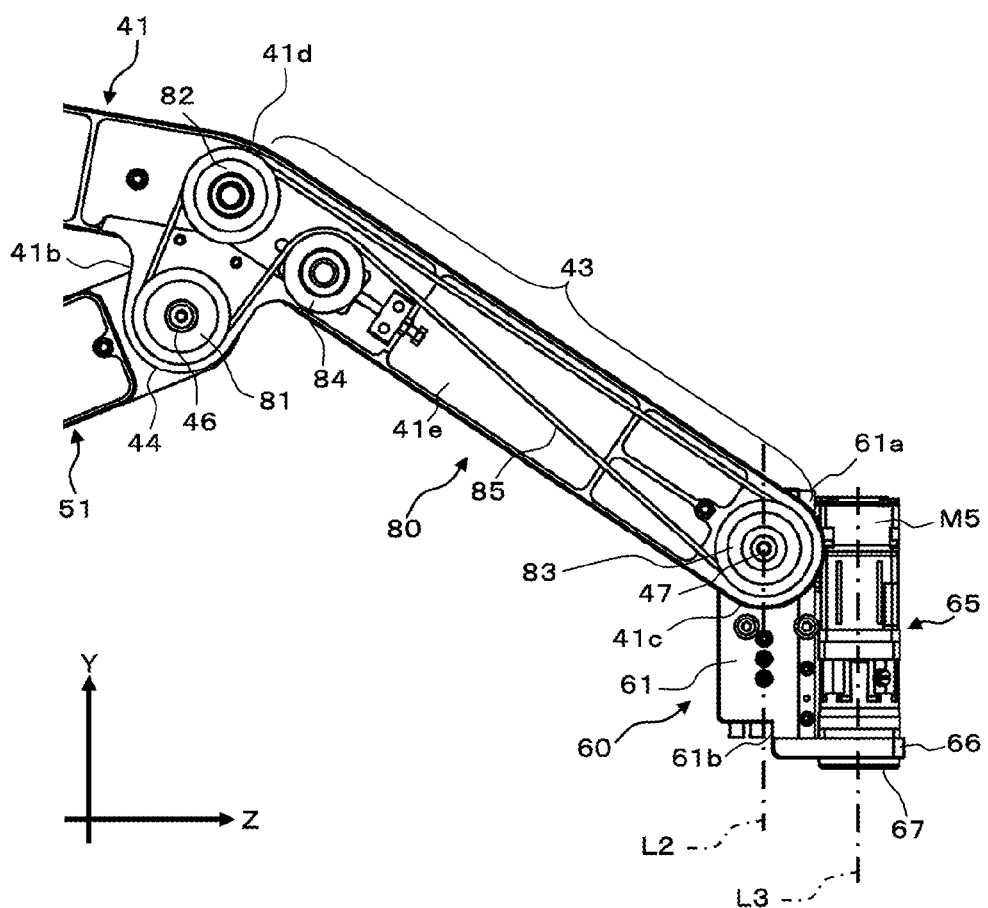
FIG. 8 is an enlarged view of a main part where a tip end part and the like of the main arm member are illustrated.

Further, the main arm member 41 is provided with a pivoting mechanism unit 80 on one side face 41e of the second section 43 and the concave part 44 of the coupling position 41b (see FIGS. 2, 3 and 8). The pivoting mechanism unit 80 transmits a pivoting amount produced by the pivot at the coupling position 41b between the main arm member 41 and the sub arm member 51, to the pivot of the joint unit 60 coupled to the tip end part 41c of the main arm member 41.

As illustrated in FIG. 8, the pivoting mechanism unit 80 has a first pulley 81 provided to a coupling shaft 46 as a center of coupling the main and sub arm members 41 and 51, an intermediate pulley 82 provided to a relatively intermediate part 41d side of the main arm member 41, a final pulley 83 provided to a coupling shaft 47 of the tip end part 41c of the main arm member 41 (and having the same diameter as the first pulley 81), and a tensioner pulley 84 provided close to the intermediate pulley 82. A belt 85 is wound around each of these pulleys 81 to 84. Note that, these coupling shafts 46 and 47 are also in parallel to the coupling shaft 45 described above. In FIG. 5, the coupling shaft 46 corresponds to a sixth axis L6 and the coupling shaft 47 corresponds to a seventh axis L7.

When the coupling angle between the main arm member 41 and the sub arm member 51 is changed by such a pivoting mechanism unit 80 and the coupling shaft 46 at the coupling position 41b pivots (rotates), accordingly, the first pulley 81 rotates, the rotation is transmitted to the final pulley 83 via the belt 85, and the coupling shaft 47 of the tip end part 41c rotates along with the final pulley 83. By such a transmission mechanism, the coupling shaft 47 of the tip end part 41c of the main arm member 41 (and the joint unit 60 attached to the coupling shaft 47) can automatically pivot cooperating with the angle change of the coupling position 41b (the pivoting amount transmitted from the first pulley 81 to the final pulley 83 are equal).

Next, the sub arm member 51 is described. The sub arm member 51 is a linear member having a desired rigidity, the base end part 51a is formed with the concave part 51e similarly to the main arm member 41, the coupling member 36 protrudingly provided upward from the first slider 30 is arranged in this concave part 51e, and a coupling shaft 52 rotatably couples the base end part 51a of the sub arm member 51 to the coupling member 36 (see FIGS. 2 and 3).

Note that, the coupling shaft 52 is also a shaft in parallel to the above-described coupling shaft 45, and corresponds to a fifth axis L5 in FIG. 5. Note that, the sub arm member 51 is secured in desired dimensions in a cross-section orthogonal to the longitudinal direction (each dimensions of height and thickness) so that, for example, a motor and electric lines for various kinds of controls can be laid and arranged inside the member.

Moreover, the tip end part 51b of the sub arm member 51 is overlapped on one face of the plate-like convex part 44 which is provided at the coupling position 41b of the above-described arm member 41, and is pivotably attached to the above-described coupling shaft 46. The sub arm member 51 coupled as described above is changed in the coupling angle with the main arm member 41 by the pivot at the coupling shaft 46.

Further, the sub arm member 51 is attached with the fourth motor M4 at a position on a relatively base end part 51a side of one side face 51c thereof (see FIGS. 2 and 3), and a drive output of this fourth motor M4 is transmitted to a drive transmission mechanism unit 90 provided to the other side face 51d of the sub arm member 51 (see FIG. 4). The drive transmission mechanism unit 90 is configured with a drive pulley 91 connected with an output shaft of the fourth motor M4, a driven pulley 92 attached to the coupling shaft 46 of the above-described coupling position 41b, and a belt 93 wound around each of these pulleys 91 and 92. When the fourth motor M4 rotates its output shaft, the rotation is transmitted to the drive pulley 91 as well as rotating the driven pulley 92 by the belt 93, and the pivot of the coupling shaft 46 of the coupling position 41b is driven. Therefore, the fourth motor M4 and the drive transmission mechanism unit 90 correspond to the pivot driving unit of the present invention.

In a case where the main and sub arm members 41 and 51 having the above-described configuration is defined such that the coupling shaft 45 on the base end part 41a side of the main arm member 41 is "A," the coupling shaft 46 of the coupling position 41b is "B," the coupling shaft 47 on the tip end part 41c is "C," and the coupling shaft 52 on the base end part 51a side of the sub arm member 51 is "D" as illustrated in FIG. 4, even if the coupling angle between both of the arm members 41 and 51 (the angle sandwiched by the first section 42 of the main arm member 41 and the sub arm member 51) is changed, the "A," "B" and "C" are positioned on the same straight line. Moreover, a first distance from "A" to "B," a second distance from "B" to "C," and a third distance from "D" to "B," are all equal to each other. Therefore, even though the main arm member 41 is bent in a boomerang-like shape, the main and sub arm members 41 and 51 are maintained as the Scott Russell mechanism. Note that, the "A" and also the "D" are positioned on the first axis L1 corresponding to the virtual straight line, and the straight line connecting the "C" and the "D" is orthogonal to the first axis L1. Moreover, with the Scott Russell mechanism, due to the operation characteristics, even if the coupling angle is changed at a fixed rate (the same speed), a moving state (moving speed) of the tip end side of the main arm member 41 is not fixed, specifically, by the change of the coupling angle at the fixed rate, as the base end parts 41a and 51a of both of the arm members 41 and 51 are separated (spaced) farther from each other, the moving situation (moving speed) of the tip end side of the main arm member 41 accelerates.

FIG. 5 illustrates a plan view of a state where the sub arm member 51 is coupled to the main arm member 41 as described above. The sub arm member 51 is arranged within the dimension of the main arm member 41 in the thickness direction (the X-axis direction in FIG. 5), and the thickness dimensions of both of the arm members 41 and 51 are significantly downsized compared to the conventional devices (devices where both of the arm members are overlapped on and coupled to each other, disclosed in Patent Documents 2 to 5 described above). Note that, in this embodiment, both of the arm members 41 and 51 are coupled so that the center lines of both of the arm members 41 and 51 in the longitudinal direction (the center line L8 illustrated in FIG. 5) are matched in a plan view direction.

Next, the joint unit 60, the rotation unit 65, and the gripping unit 70 coupled to the tip end side of the main arm member 41 are described. The joint unit 60 is configured with a cuboid joint member 61, and a rear end part 61a is arranged within the concave part 41g formed on the tip end side of the main arm member 41 described above and attached to the coupling shaft 47. Thus, when the coupling shaft 47 pivots, the joint unit 60 pivots. Note that, in a reference state (origin resuming state), the joint unit 60 is fixed to the coupling shaft 47 so that a directional axis from the rear end part 61a of the joint member 61 to a tip end part 61b of the joint member 61 (corresponding the second axis L2 illustrated in FIG. 4) is in parallel to a pivot center axis of both of the arm members 41 and 51 on the base end side (corresponding to the first axis L1 illustrated in FIG. 4). Therefore, even when the coupling angle at the coupling position 41b between both of the arm members 41 and 51 is changed, by the work of the above-described pivoting mechanism unit 80 provided to the main arm member 41, a state of the second axis L2 relating to the joint unit 60 regarding the first axis L1 maintained such that it is automatically substantially in parallel.

The rotation unit 65 is coupled to one side of the joint unit 60. The rotation unit 65 has the fifth motor M5 therein and also includes a supporting plate 66 supporting the tip end side of the fifth motor M5, and a rotor 67 for being rotated by the fifth motor M5 (see FIGS. 2, 4, 8, etc.). As illustrated in FIGS. 4 and 8, the fifth motor M5 is arranged such that its rotational axis (corresponding to a third axis L3) is in parallel to the directional axis of the joint unit 60 (the second axis L2).

The rotor 67 of the rotation unit 65 is attached with the gripping unit 70. The gripping unit 70 is arranged to face thereto, with a gripping claw 71 corresponding to a shape of a workpiece as a grip target (see FIG. 2), and such a gripping claw 71 can be opened and closed by a pneumatic cylinder.

Next, the first to fifth motors M1 to M5 are described. As each of the motors M1 to M5 in this embodiment, a motor with a rotary encoder is used so that an operation state of each of the motors M1 to M5 can be detected using a rotation amount detection by the rotary encoder. Moreover, in this embodiment, a brake function is provided to the motors M1, M2 and M4 in the aim of stabilizing the postures of the main and sub arm members 41 and 51 in a stable state (the brake function may also be provided to the motors M3 and M5 obviously). A motor controller (not illustrated) is connected with each of these motors M1 to M5, the rotation of each of the motors M1 to M5 is individually controlled, and a control of synchronizing a plurality of motors is also performed in some cases.

For the rotation of the first motor M1, when the rotation thereof is driven, the first slider 30 linearly moves in the direction of the arrow (3) or the arrow (4) illustrated in FIG. 4 according to the direction of the rotation. Moreover, when the second motor M2 is driven, the second slider 20 linearly moves in the direction of the arrow (1) or the arrow (2) illustrated in FIG. 4 according to the direction of the rotation.

Therefore, for example, when the second motor M2 is rotated so that the second slider 20 linearly moves in the direction of the arrow (1) illustrated in FIG. 4, the coupling angle between the first section 42 of the main arm member 41 and the sub arm member 51 changes to be larger. Moreover, when the second motor M2 is rotated so that the second slider 20 linearly moves in the direction of the arrow (2), the coupling angle changes to be smaller. Furthermore, when the first motor M1 is rotated so that the first slider 30 linearly moves in the direction of the arrow (4), the coupling angle changes to be larger, and when the first motor M1 is rotated so that the first slider 30 linearly moves in the direction of the arrow (3), the coupling angle changes to be smaller. Such changes of the coupling angle are performed by the pillar unit 10, the first and second sliders 30 and 20, and therefore, the pillar unit 10, the first and second sliders 30 and 20 function as the angle changer of the present invention.

Note that, in a case where the change of increasing the coupling angle is desired to be performed quickly, the rotations of the first and second motors M1 and M2 are controlled so that the linear movement of the second slider 20 in the direction of the arrow (1) and the linear movement of the first slider 30 in the direction of the arrow (4) are performed simultaneously. Similarly, in a case where the change of reducing the coupling angle is desired to be performed quickly, the rotations of the first and second motors M1 and M2 are controlled so that the linear movement of the second slider 20 in the direction of the arrow (2) and the linear movement of the first slider 30 in the direction of the arrow (3) are performed simultaneously.

Figure 9:
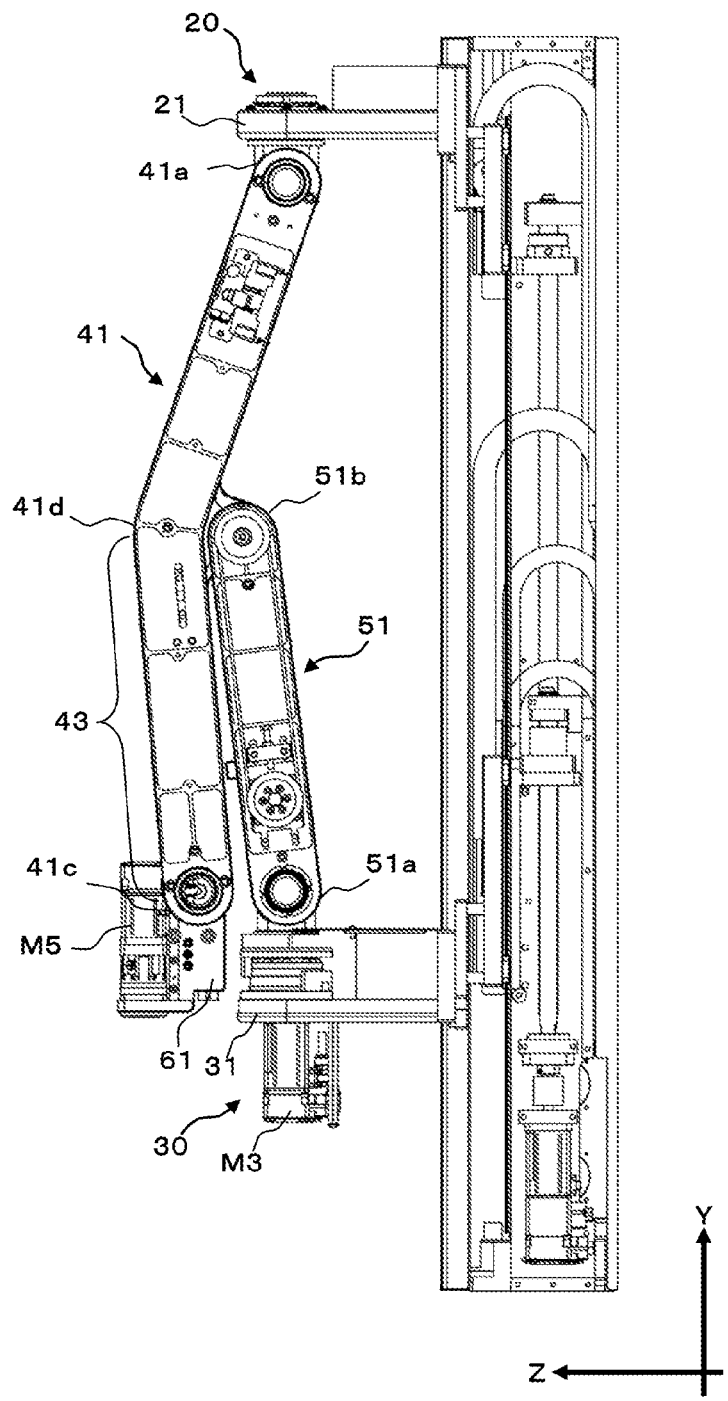
FIG. 9 is a side view of the Scott Russell mechanism device where a state in which base end parts of the main arm member and the sub arm member are separated from each other is illustrated.

In a case where the base end parts 41a and 51a of both of the arm members 41 and 51 are made to be in the positional relation where they are most separated from each other by such rotation controls of the first and second motors M1 and M2, as illustrated in FIG. 9, the second section 43 of the main arm member 41 becomes substantially parallel to the sub arm member 51. Therefore, the tip end part 41a of the main arm member 41 can be brought close to right beside the base end part 51a of the sub arm member 51, and the Scott Russell mechanism device 1 of this embodiment becomes suitable for an application in which it is required to draw the tip end of the main arm member 41 to the side close to the pillar unit 10. Additionally, due to the operation characteristics of the above-described Scott Russell mechanism itself, even when the change rate of the coupling angle is fixed (the angle changing speed is fixed), since the moving speed of the tip end part 41a of the main arm member 41 increases as the base end parts 41a and 51a are separated farther from each other, drawing the tip end part 41a of the main arm member 41 to the pillar unit 10 becomes speedy, and an efficient drawing operation can be achieved.

Note that, the rotations of the first and second motors M1 and M2 can also be controlled such that the first and second sliders 20 and 30 linearly move in the same direction at the same speed, and in such a control, the main and sub arm members 41 and 51 move up and down along the Y-axis while maintaining the coupling angle.

Moreover, the pivot of the third motor M3 becomes, as illustrated in FIG. 5, the pivot (turning) of the main and sub arm members 41 and 51 in the arrow direction in FIG. 5 centering on the first axis L1. Since such a turning is performed regardless of the pillar unit 10 having a heavy weight, compared to the case of the conventional industrial robot relating to Patent Document 1, the drive torque caused by the third motor M3 required for turning is reduced, and therefore, the turning operation that is smooth and excellent in responsiveness can be achieved. Note that, even if the main and sub arm members 41 and 51 are turned largely, the attachment position of the fourth motor M4 is set such that the fourth motor M4 attached to the sub arm member 51 does not interfere with the pillar unit 10.

Next, the pivot of the fourth motor M4 is described. First, even when the coupling angle is changed by linearly moving either one of the second slider 20 and the first slider 30 as described above in a state where the fourth motor M4 is free and not pivoted, the joint unit 60 coupled to the tip end part 41c of the main arm member 41 is automatically pivoted by the pivoting mechanism unit 80 so as to maintain the state where the directional axis of the joint unit 60 (the second axis L2; see FIG. 4) is substantially in parallel to the first axis L1. Additionally, when the fourth motor M4 is pivoted, the pivot of the fourth motor M4 is transmitted to the coupling shaft 47 via the drive transmission mechanism unit 90 and the pivoting mechanism unit 80, and the joint unit 60 can pivot independently from the above pivots. Therefore, the joint unit 60 can swing to pivot centering on the coupling shaft 47 by the pivot control of the fourth motor M4.

Figure 10:
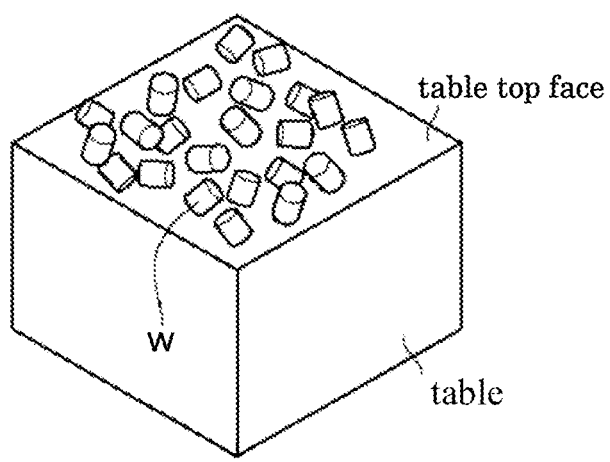
FIG. 10 is a schematic view illustrating one example of workpieces as grip targets.

Furthermore, when the fifth motor M5 is pivoted, the gripping unit 70 rotates centering on the third axis L3, and the direction of the gripping claw 71 can be changed freely. Additionally, by combining the pivots of the respective motors M1 to M5 described above, for example, the position and the posture of the gripping unit 70 can be freely arranged, and accordingly, the Scott Russell mechanism device 1 according to this embodiment can suitably be used, for example, in a case of gripping workpieces W which are loaded in bulk in various directions on a table top face of a table illustrated in FIG. 10.

Note that, the Scott Russell mechanism device 1 according to the first embodiment is not limited to the above-described contents, and various kinds of modified examples are considered. For example, the bending form of the main arm member 41 may be, instead of having the shape in which the linear first and second sections 42 and 43 are bent therebetween at the intermediate part 41d (coupling position 41b), but a boomerang-like shape in which the entire main arm member curves into an arc to have a shape that a stress concentration is not easily generated, by eliminating the bending point at the intermediate part 41d (coupling position 41b).

Moreover, in a case where it is desired to point the gripping unit 70 upwardly (the direction in which the arrow of the Y-axis indicates), the main and the sub arm members 41 and 51 are arranged upside down so that the base end part 41a of the main arm member 41 is coupled to the first slider 30 and the base end part 51a of the sub arm member 51 is coupled to the second slider 20. Additionally, in a case of simplifying the structure, either one of the drive system regarding the first ball screw 12 and the first slider 30 or the drive system regarding the second ball screw 14 and the second slider 20 may be omitted to have a configuration where only either one of the base end part 41a of the main arm member 41 or the base end part 51a of the sub arm member 51 is linearly movable (such a simplified configuration is also applicable to the case where the main and the sub arm members 41 and 51 described above are arranged upside down).

Further, regarding the mechanism for pivoting the joint unit 60 in cooperation with the change of the coupling angle, in order to automatically pivot while maintaining the state where the directional axis of the joint member 61 (the second axis L2 illustrated in FIG. 4) is more accurately in parallel to the turning center axis of both of the arm members 41 and 51 (the first axis L1 illustrated in FIG. 4), the configuration as follows is preferable. That is, the drive pulley 91 illustrated in FIG. 4 is fixed to the coupling shaft 52 located on the base end part 51a side of the sub arm member 51, and this coupling shaft 52 is also fixed to the base end part 51a. For example, key grooves are formed in the coupling shaft 52 and a shaft hole, the coupling shaft 52 is fixed to both the drive pulley 91 and the sub arm member 51 by press-fitting a key therein. Note that, in this configuration, the fourth motor M4 is moved to the main arm member 41 as described later. By the configuration as described above, the drive pulley 91 rotates corresponding to the pivot of the base end part 51a of the sub arm member 51, and the rotation amount is transmitted from the driven pulley 92 to the coupling shaft 47 of the tip end part 41c of the main arm member 41 via the pivoting mechanism unit 80 illustrated in FIG. 8. Therefore, since the joint unit 60 (joint member 61) pivots by the rotation amount of the base end part 51a of the sub arm member 51, even if the coupling angle between both of the members 41 and 51 changes, the parallel state of the second and first axes L2 and L1 is maintained more accurately.

Moreover, with the configuration as described above, it is suitable for the fourth motor M4 to be arranged in the main arm member 41 so that any one of the first pulley 81, the intermediate pulley 82, or the final pulley 83 provided to the pivoting mechanism unit 80 illustrated in FIG. 8 is driven. Thus, the joint unit 60 (joint member 61) can be pivoted in two kinds of manners of the automatic pivoting described above and the controlled pivot by the fourth motor M4.

Furthermore, the third motor M3 may also be arranged on the second slider 20 side. Since the third motor M3 basically has a predetermined weight, it is preferable to arrange the third motor M3 in the slider with a lower moving frequency. Further, as the unit attached to the tip end side of the main arm member 41, various kinds of units may be coupled according to the applications, for example.

Figure 11:
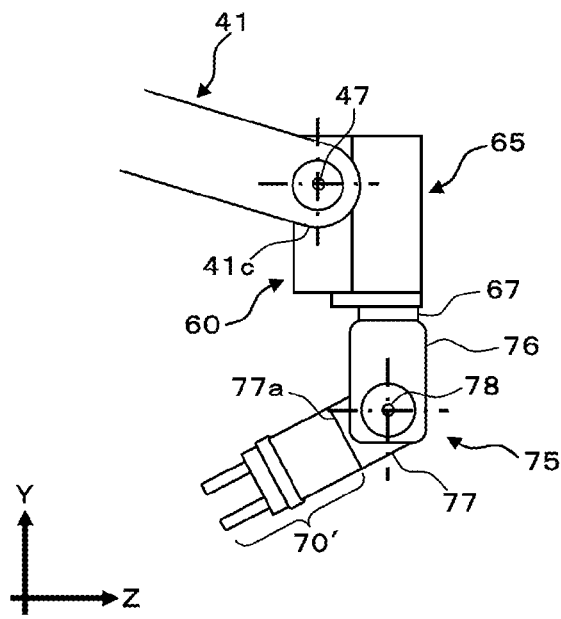
FIG. 11(a) is a schematic view illustrating each unit coupled to a tip end side of the main arm member of a modified example.
FIG. 11(b) is a schematic view illustrating each unit according to another modified example.
Figure 11:
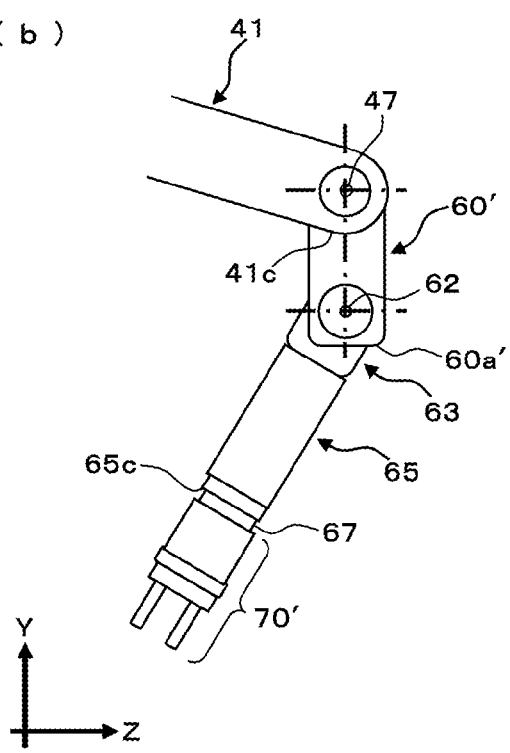

FIGS. 11(a) and 11(b) illustrate modified examples of various kinds of units coupled to the tip end part 41c of the main arm member 41. FIG. 11(a) is similar to the description above to the extent that the joint unit 60 and the rotation unit 65 are coupled to the tip end part 41c of the main arm member 41, but the further tip side thereof is different from the description above. That is, a pivoting unit 75 is coupled to the rotor 67 of the rotation unit 65, a gripping unit 70' is attached to a tip end side thereof. In the pivoting unit 77, a first member 76 is pivotably coupled to a second member 77 by a coupling shaft 78, and this coupling shaft 78 is a shaft in parallel to the coupling shaft 47 of the tip end part 41c of the main arm member 41 described above. By pivoting this coupling shaft 78 by a motor (not illustrated) attached to the first member 76, the pivot of the second member 77 is performed. Thus, the degree of freedom regarding the posture of the gripping unit 70' attached to the tip end part 77a of the second member 77 can further be increased.

FIG. 11(b) is another modified example in which an arm-like joint unit 60' is pivotably coupled to the tip end part 41b of the main arm member 41, and the joint unit 60' pivotably couples an intermediate unit 63 (corresponding to the pivoting member) to a tip end part 60a'. A coupling shaft 62 associated with a pivot of the tip end part 60a' is parallel to the coupling shaft 47 of the tip end part 41c of the main arm member 41. Moreover, the rotation unit 65 is coupled to the intermediate unit 63 and the gripping unit 70' is attached to the rotor 67 provided to the rotation unit 65. In the example illustrated in FIG. 11(b), since, compared to the example illustrated in FIG. 11(a), the orders of the rotation and the pivot are reversed, the range relating to the posture change of the gripping unit 70' located at the tip end is also different from the case of FIG. 11(a), by applying FIG. 11(a) or FIG. 11(b) according to the application, an optimal posture for the gripping of the gripping unit 70' can be obtained.

Moreover, other than the application of gripping, for example, in a case of applying to the application of placing and moving the workpieces, a placing unit or the like is attached instead of the gripping unit 70. Moreover, for example, such a gripping unit 70 and the placing unit may, if the posture change and the like by the rotation are unnecessary, be coupled to the joint unit 60 described above and, further in a case where the structure is simplified, be pivotably attached to the coupling shaft 47 of the tip end part 41c of the main arm member 41 directly. Furthermore, other than the gripping and placing, a unit corresponding to the various kinds of work, such as transportation and pressuring, may be attached instead of the gripping units 70 and 70' described above to widen the application of the Scott Russell mechanism device 1 according to the first embodiment.

Figure 12:
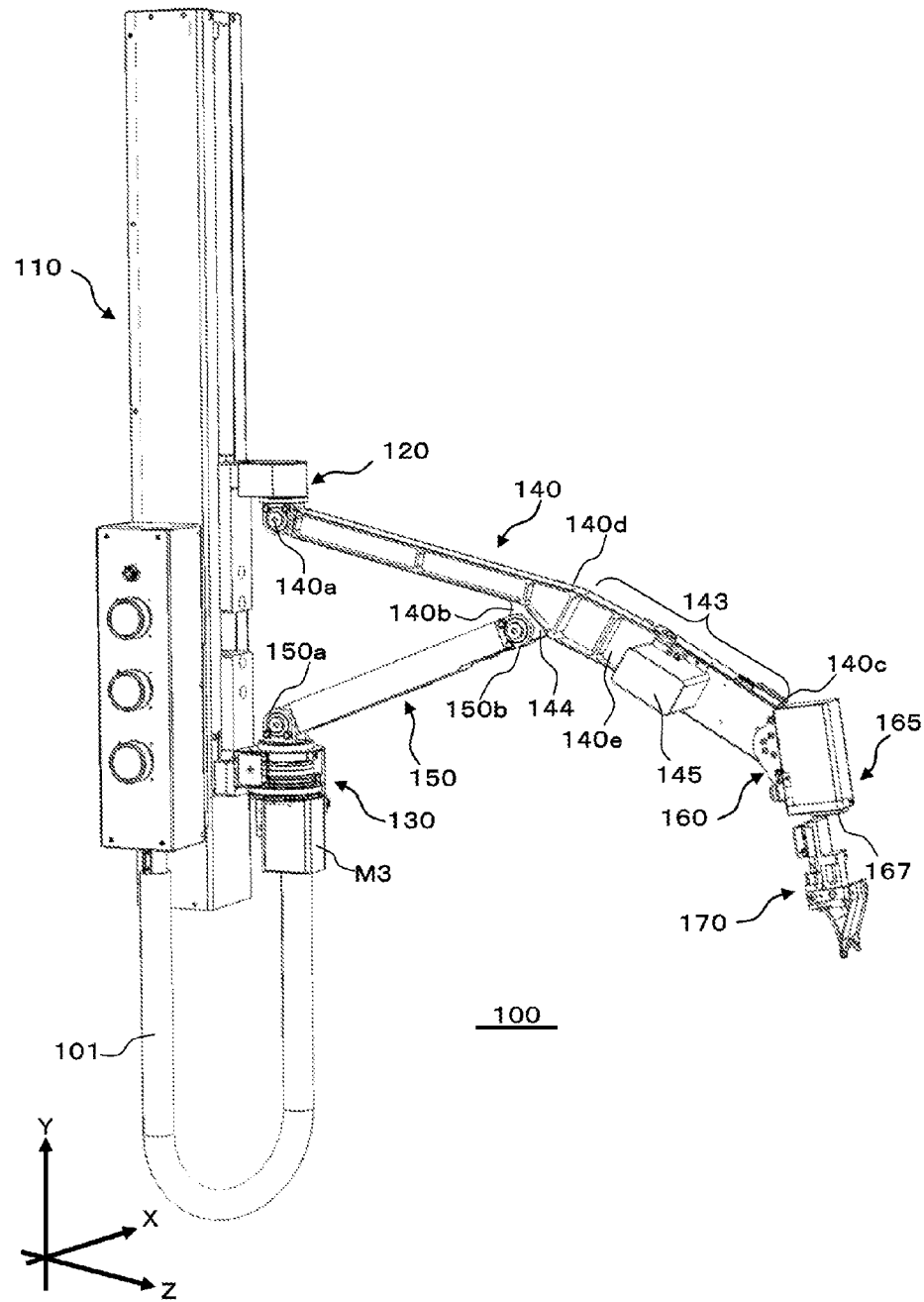
FIG. 12 is a perspective view illustrating a Scott Russell mechanism device according to a second embodiment of the present invention.
Figure 13:
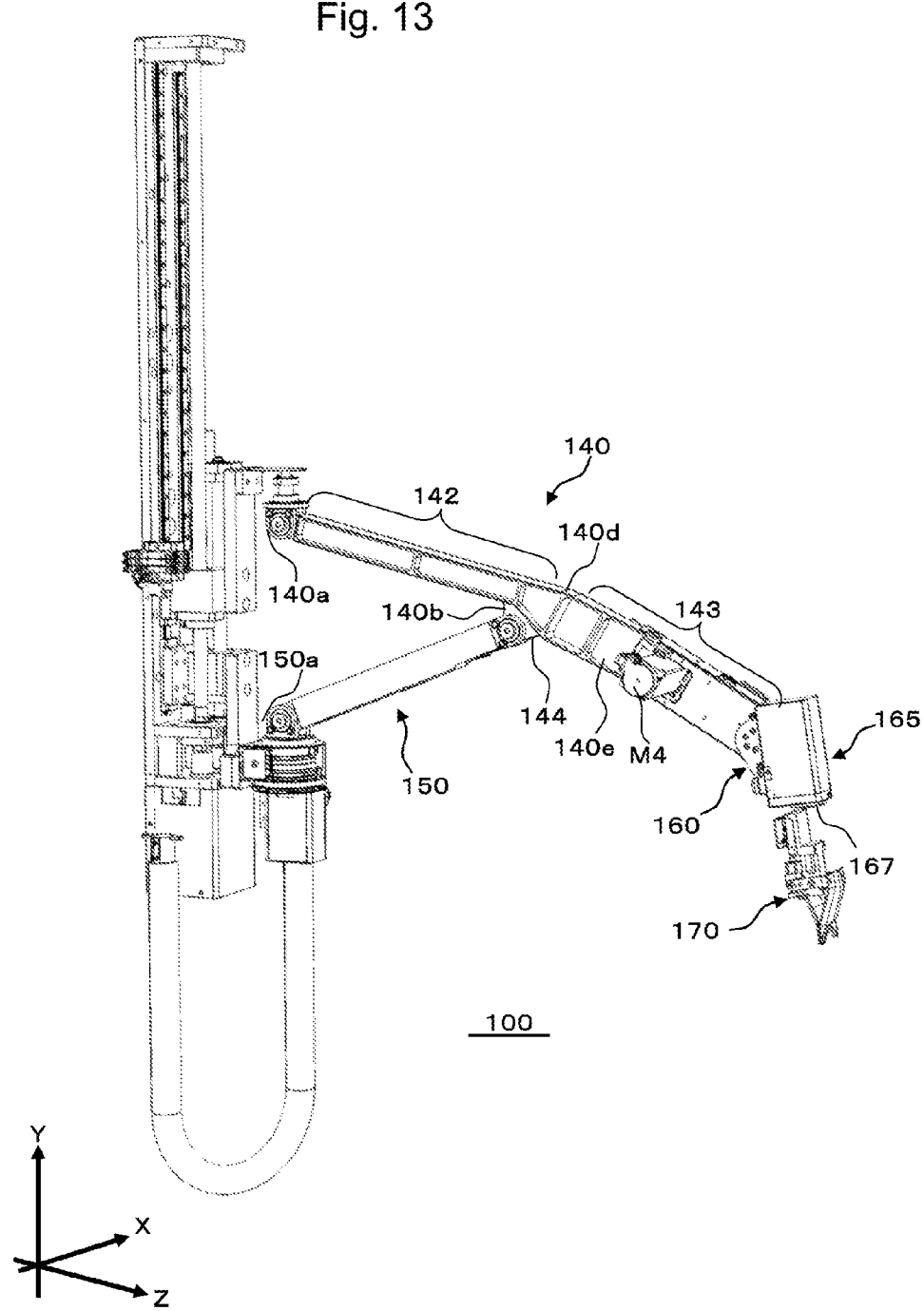
FIG. 13 is a perspective view illustrating the Scott Russell mechanism device of the second embodiment in a state where covers covering an outer circumference of the Scott Russell mechanism device are removed.
Figure 14:
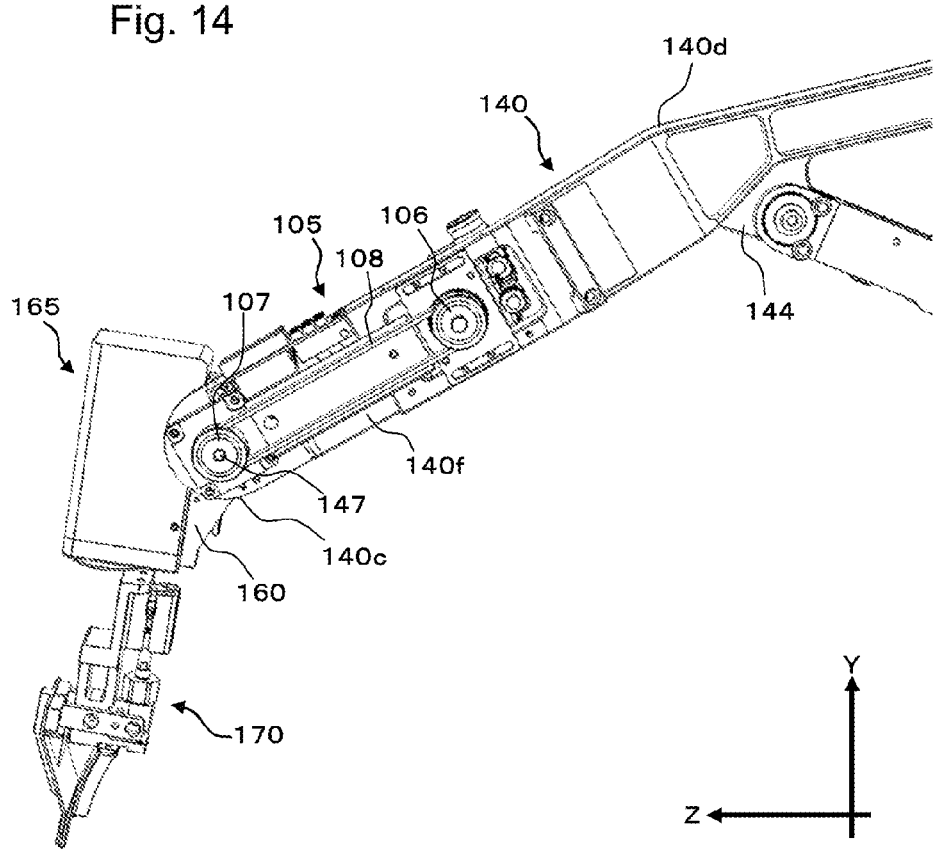
FIG. 14 is a schematic view illustrating a tip end part and the like of a main arm member of the Scott Russell mechanism device of the second embodiment.

FIGS. 12 to 14 illustrate a Scott Russell mechanism device 100 according to a second embodiment of the present invention. The Scott Russell mechanism device 100 according to the second embodiment is basically similar to the Scott Russell mechanism device 1 of the first embodiment, but the main differences are points with the different arrangement position of the fourth motor M4 and the pivoting mechanism unit 80 is omitted.

That is, the Scott Russell mechanism device 100 of the second embodiment couples a base end part 140a of a main arm member 140 and a base end part 150a of a sub arm member 150 to a second slider 120 and a first slider 130 provided to a pillar unit 110, respectively, and a rotation unit 165 is coupled to a tip end part 140c of the main arm member 140 via a plate-like joint unit 160, and a gripping unit 170 is attached to a rotation unit 167 provided to the rotation unit 165. Note that, in the second embodiment, wiring for the third motor M3 attached to the first slider 130 is drawn outside the pillar unit 110, and therefore, a wiring tube 101 for protecting the wiring is suspended in a U-shape.

Further, the main arm member 140 is overall formed into a boomerang-like shape (the shape of the Japanese kana character "HE") by being bent at an intermediate part 140d (and a coupling position 140b coupled to the sub arm member 150 located on the other side of the intermediate part 140d), and has a linear first section 142 in an area from the base end part 140a to the intermediate part 140d (coupling position 140b), a linear second section 143 in an area from the intermediate part 140d (coupling position 140b) to the tip end part 140c. The main arm member 140 has a plate-like convex part 144 at the coupling position 140b.

Moreover, in the main arm member 140, the fourth motor M4 is arranged inside a motor cover 145 attached to one side face 140e of the second section 143 on the tip side (see FIGS. 12 and 13). Note that, in order to arrange the fourth motor M4 as described above, the second section 143 of the main arm member 140 has a wider width compared to the first section 142.

The output shaft of the fourth motor M4 is coupled to a first pulley 106 of a rotation transmission unit 105 provided to another side face 140f (see FIG. 14). Further, the rotation transmission unit 105 has a second pulley 107 attached to a coupling shaft 147 provided to the tip end part 140c of the main arm member 140, and a belt 108 wound around each of the pulleys 106 and 108. Thus, when the fourth motor M4 is rotated, the rotation is transmitted to the coupling shaft 147 via the rotation transmission unit 105. Moreover, since the coupling shaft 147 is attached with the joint unit 160, the rotation unit 165 and the gripping unit 170 attached to the joint unit 160 rotate. Note that, in the second embodiment, the fourth motor M4 and the rotation transmission unit 105 are both equivalent to the pivot driving unit.

As for the Scott Russell mechanism device 100 according to the second embodiment, since all the pivots of the coupling shaft 147 of the tip end part 140c of the main arm member 140 and the joint unit 160 are controlled by the fourth motor M4, the automatic pivot due to the coupling angle in the first embodiment is omitted. Thus, the second embodiment has a merit that the drive structure relating to the pivot on the tip end side of the main arm member 140 can be simplified more than the first embodiment.

Note that, also as for the Scott Russell mechanism device 100 according to the second embodiment, various kinds of modified examples described in the first embodiment can be applied. Moreover, if the fourth motor M4 does not interfere with, for example, the rotation unit 165, the transmission rotation unit 105 may be omitted, and the fourth motor M4 may be coupled in the output shaft thereof to the coupling shaft 147 directly.

INDUSTRIAL APPLICABILITY

The present invention can suitably be used for, for example, the gripping application, placing application, transportation application in which it is requested to bring the tip end part of the main arm member close to right beside the base end part of the sub arm member.

DESCRIPTION OF REFERENCE NUMERALS 1, 100: Scott Russell Mechanism Device
10, 100: Pillar Unit
12: First Ball Screw
14: Second Ball Screw
20, 120: Second Slider
30, 130: First Slider
41, 140: Main Arm Member
41b, 140b: Coupling Position
51, 150: Sub Arm Member
60, 160: Joint Unit
65, 165: Rotation Unit
70, 170: Gripping Unit
80: Pivoting Mechanism Unit
M1-M5: First Motor to Fifth Motor

The invention claimed is:
1. A Scott Russell mechanism device, comprising:
a main arm member;
a sub arm member pivotably coupled to the main arm member by a coupling shaft; and
an angle changer for changing a coupling angle between the main arm member and the sub arm member,
wherein a base end part of the main arm member and a base end part of the sub arm member that is on the opposite side from the coupling side of the sub arm member are positioned on the same virtual straight line, and a first distance from the base end part of the main arm member to a coupling position of the main arm member to the sub arm member, a second distance from the coupling position of the main arm member to a tip end part thereof, and a third distance from the base end part of the sub arm member to the coupling position are equal to each other,
wherein the main arm member is protrudingly provided with a convex part at a side coupled to the sub arm member on the coupling position,
wherein the main arm member is formed into a boomerang shape such that the coupling position is curved to make the base end part of the main arm member, the coupling shaft of the convex part, and the tip end part of the main arm member positioned on a same straight line, and
wherein an angle of the side coupled to the sub arm member on the coupling position is made narrower than 180°.

2. The Scott Russell mechanism device of claim 1, wherein the sub arm member is linearly formed,
wherein the main arm member is formed linearly in a first section extending from the base end part to the part corresponding to the coupling position and in a second section extending from the part corresponding to the coupling position to the tip end part, and the part corresponding to the coupling position is curved, and
wherein the degree of the curve of the main arm member is defined such that the second section of the main arm member becomes at a substantially parallel angle to the sub arm member when the angle changer changes the coupling angle so that the base end parts of the main arm member and the sub arm member are most separated from each other.

3. The Scott Russell mechanism device of claim 2, wherein the main arm member and the sub arm member are pivotable about the virtual straight line as a pivoting axis thereof, the angle changer including:
a first ball screw arranged in parallel to the virtual straight line; and
a first linearly-moving unit for being linearly moved by a rotation of the first ball screw, and
wherein either one of the base end part of the main arm member or the base end part of the sub arm member is pivotably coupled to the first linearly-moving unit about the virtual straight line as the pivoting axis thereof, and
wherein the device comprises a pivoting drive source for driving the pivots of the main arm member and the sub arm member centering on the pivoting axis.

4. The Scott Russell mechanism device of claim 3, wherein the angle changer further includes:
a second ball screw arranged in parallel to the first ball screw; and
a second linearly-moving unit for being linearly moved by a rotation of the second ball screw, and
wherein either one of the base end part of the sub arm member or the base end part of the main arm member is pivotably coupled to the second linearly-moving unit about the virtual straight line as the pivoting axis thereof.

5. The Scott Russell mechanism device of claim 2, wherein a joint unit is pivotably coupled to the tip end part of the main arm member, and
wherein a pivoting axis of the pivot of the joint unit is in parallel to an axis of the pivots of the main arm member and the sub arm member at the coupling position, and
wherein the device comprises a pivot driving unit provided at any portion from the coupling position toward the tip end side of the main arm member and for pivoting the joint unit.

6. The Scott Russell mechanism device of claim 5, wherein a rotation unit having a rotor is coupled to the joint unit.

7. The Scott Russell mechanism device of claim 6, wherein a gripping unit is attached to the rotor of the rotation unit.

8. The Scott Russell mechanism device of claim 5, wherein a pivoting member is pivotably coupled to the joint unit,
wherein an axis of the pivot of the pivoting member is in parallel to the pivoting axis of the joint unit, and
wherein a rotation unit having a rotor is coupled to the pivoting member.

9. The Scott Russell mechanism device of claim 8, wherein a gripping unit is attached to the rotor of the rotation unit.

10. The Scott Russell mechanism device of claim 5, wherein a rotation unit having a rotor is coupled to the joint unit, and
a pivoting unit having a pivoting part that is pivotable centering on an axis in parallel to the pivoting axis of the joint unit is coupled to the rotor of the rotation unit.

11. The Scott Russell mechanism device of claim 10, wherein a gripping unit is attached to a tip end side of the pivoting unit.

12. The Scott Russell mechanism device of claim 1, wherein the main arm member and the sub arm member are pivotable about the virtual straight line as a pivoting axis thereof, the angle changer including:
a first ball screw arranged in parallel to the virtual straight line; and
a first linearly-moving unit for being linearly moved by a rotation of the first ball screw, and
wherein either one of the base end part of the main arm member or the base end part of the sub arm member is pivotably coupled to the first linearly-moving unit about the virtual straight line as the pivoting axis thereof, and
wherein the device comprises a pivoting drive source for driving the pivots of the main arm member and the sub arm member centering on the pivoting axis.

13. The Scott Russell mechanism device of claim 12, wherein the angle changer further includes:
a second ball screw arranged in parallel to the first ball screw; and
a second linearly-moving unit for being linearly moved by a rotation of the second ball screw, and
wherein either one of the base end part of the sub arm member or the base end part of the main arm member is pivotably coupled to the second linearly-moving unit about the virtual straight line as the pivoting axis thereof.

14. The Scott Russell mechanism device of claim 1, wherein a joint unit is pivotably coupled to the tip end part of the main arm member, and
wherein a pivoting axis of the pivot of the joint unit is in parallel to an axis of the pivots of the main arm member and the sub arm member at the coupling position, and
wherein the device comprises a pivot driving unit provided at any portion from the coupling position toward the tip end side of the main arm member and for pivoting the joint unit.

15. The Scott Russell mechanism device of claim 14, wherein a rotation unit having a rotor is coupled to the joint unit.

16. The Scott Russell mechanism device of claim 15, wherein a gripping unit is attached to the rotor of the rotation unit.

17. The Scott Russell mechanism device of claim 14, wherein a pivoting member is pivotably coupled to the joint unit,
- wherein an axis of the pivot of the pivoting member is in parallel to the pivoting axis of the joint unit, and
- wherein a rotation unit having a rotor is coupled to the pivoting member.

18. The Scott Russell mechanism device of claim 17, wherein a gripping unit is attached to the rotor of the rotation unit.

19. The Scott Russell mechanism device of claim 14, wherein a rotation unit having a rotor is coupled to the joint unit, and
- a pivoting unit having a pivoting part that is pivotable centering on an axis in parallel to the pivoting axis of the joint unit is coupled to the rotor of the rotation unit.

20. The Scott Russell mechanism device of claim 19, wherein a gripping unit is attached to a tip end side of the pivoting unit.

* * * * *